United States Patent
Urakawa (10) Patent No.: US 12,523,546 B2
(45) Date of Patent: Jan. 13, 2026

(54) MEASUREMENT APPARATUS, MEASUREMENT SYSTEM, SUBSTRATE PROCESSING APPARATUS, AND MEASUREMENT METHOD

(71) Applicant: Tokyo Electron Limited, Tokyo (JP)

(72) Inventor: Kosuke Urakawa, Miyagi (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 624 days.

(21) Appl. No.: 17/700,785

(22) Filed: Mar. 22, 2022

(65) Prior Publication Data
US 2022/0307919 A1    Sep. 29, 2022

(30) Foreign Application Priority Data

Mar. 29, 2021   (JP) .................. 2021-055554

(51) Int. Cl.
*G01K 11/32*  (2021.01)
*H01L 21/66*  (2006.01)

(52) U.S. Cl.
CPC .............. *G01K 11/32* (2013.01); *H01L 22/30* (2013.01)

(58) Field of Classification Search
CPC .... G01K 11/32; G01K 11/3213; H01L 22/30; H01L 21/6831; H01L 21/67248; H01J 37/244; H01J 37/32091; H01J 2237/2443; H01J 2237/24585; G01D 5/3537; G01D 5/35383
See application file for complete search history.

(56) References Cited

U.S. PATENT DOCUMENTS

| | | | | |
|---|---|---|---|---|
| 5,449,233 A * | 9/1995 | Sai | ........................ | G01K 11/32 374/161 |
| 5,765,948 A * | 6/1998 | Sai | ........................ | G01K 11/32 374/161 |
| 2007/0223556 A1* | 9/2007 | Lee | ........................ | G01K 15/00 374/161 |
| 2018/0052045 A1* | 2/2018 | Sun | ........................ | G01J 1/58 |
| 2020/0064199 A1* | 2/2020 | Magel | ..................... | G01J 5/025 |

FOREIGN PATENT DOCUMENTS

| JP | S63217483 A | 9/1988 |
|---|---|---|
| JP | 2018049726 A | 3/2018 |

* cited by examiner

*Primary Examiner* — Fernando L Toledo
*Assistant Examiner* — Marshall Mu-Nuo Hatfield
(74) *Attorney, Agent, or Firm* — Nath, Goldberg & Meyer; Jerald L. Meyer; Tanya E. Harkins (57) ABSTRACT

A measurement apparatus includes: an input part into which a signal according to a state of a measurement target is input; a measurement part configured to measure the state of the measurement target from the signal input to the input part, and generate, when the measurement of the state of the measurement target is completed, a switching instruction signal instructing switching a multiplexer configured to selectively output the signal; and an output part configured to output the switching instruction signal generated by the measurement part.

15 Claims, 6 Drawing Sheets

MEASUREMENT APPARATUS, MEASUREMENT SYSTEM, SUBSTRATE PROCESSING APPARATUS, AND MEASUREMENT METHOD

CROSS-REFERENCE TO RELATED APPLICATION

This application is based upon and claims the benefit of priority from Japanese Patent Application No. 2021-055554, filed on Mar. 29, 2021, the entire contents of which are incorporated herein by reference.

TECHNICAL FIELD

The present disclosure relates to a measurement apparatus, a measurement system, a substrate processing apparatus, and a measurement method.

BACKGROUND

Patent Document 1 discloses a method in which a multiplexer selectively outputs input data from a large number of input data to a measurement module in order and the measurement module measures the input data input thereto to collect data of channels.

PRIOR ART DOCUMENT

Patent Document

Patent Document 1: Japanese Laid-Open Patent Publication No. S63-217483

SUMMARY

According to one embodiment of the present disclosure, there is provided a measurement apparatus including: an input part into which a signal according to a state of a measurement target is input; a measurement part configured to measure the state of the measurement target from the signal input to the input part, and generate, when the measurement of the state of the measurement target is completed, a switching instruction signal instructing switching a multiplexer configured to selectively output the signal; and an output part configured to output the switching instruction signal generated by the measurement part.

BRIEF DESCRIPTION OF DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Hereinafter, embodiments of a measurement apparatus, a measurement system, a substrate processing apparatus, and a measurement method disclosed herein will be described in detail with reference to the drawings. The disclosed measurement apparatus, measurement system, substrate processing apparatus, and measurement method are not limited by the embodiments.

In Patent Document 1, a controller in which a switching operation pattern is written in an internal memory outputs a switching instruction to the multiplexer according to the switching operation pattern. In response to the switching instruction, the multiplexer alternatively outputs the input data to the measurement module from the large number of input data. In this case, it is necessary for the controller to output the switching instruction to the multiplexer with a margin for a period during which the input data are measured by the measurement module. Therefore, in the switching operation pattern, switching timing is determined with a margin. Therefore, in Patent Document 1, the measurement time becomes long. In particular, when measuring a large number of input data, the measurement time becomes longer because the margin becomes large.

Therefore, a technique for shortening a measurement time is needed.

Embodiments

[Configuration of Apparatus]

Figure 1:
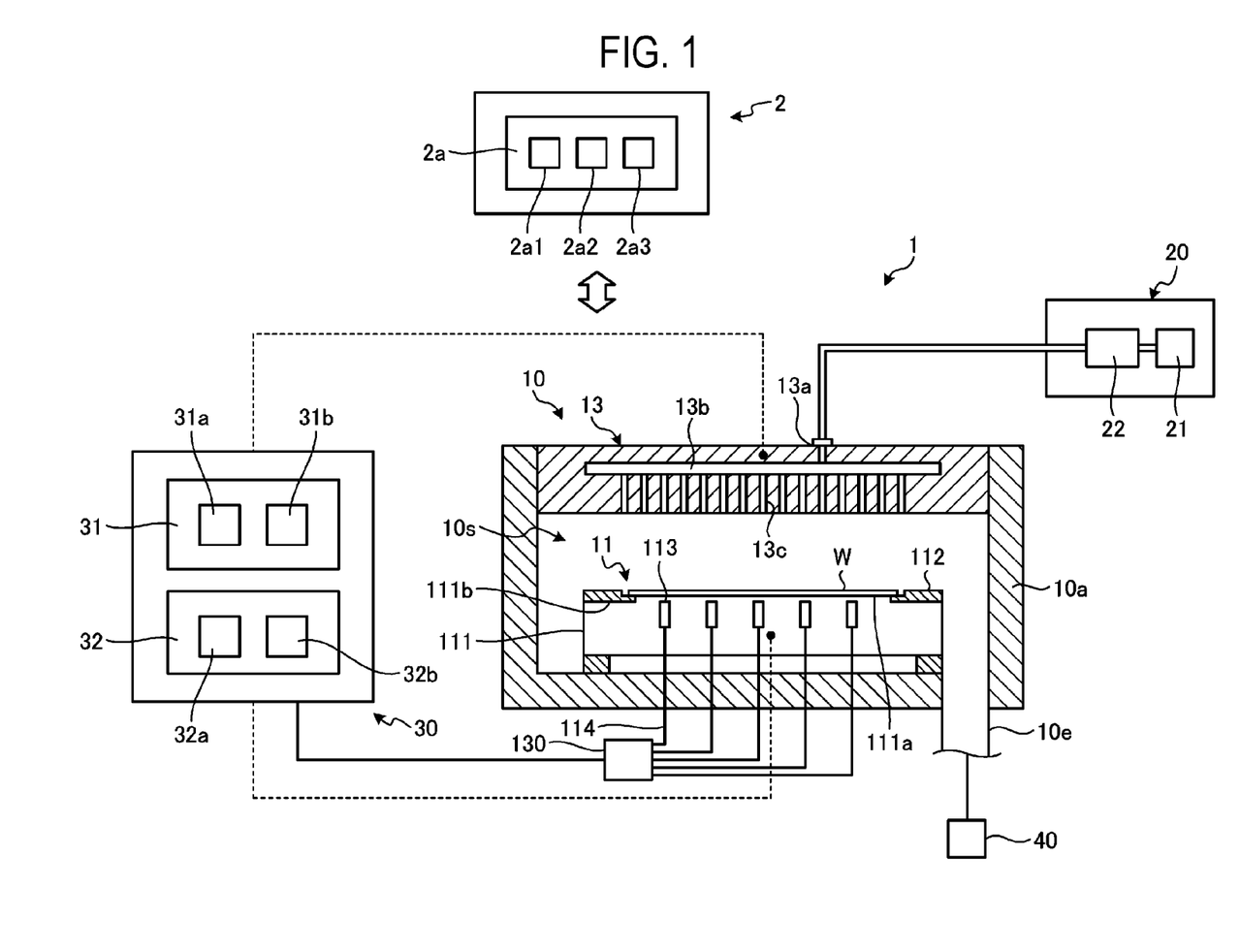
FIG. 1 is a view illustrating an example of a schematic configuration of a plasma processing system according to an embodiment.

An example of a substrate processing apparatus of the present disclosure will be described. In an embodiment, the case where the substrate processing apparatus of the present disclosure is a plasma processing system having a system configuration will be described as an example. In an embodiment, the case where the temperature of a measurement target is measured as the state of the measurement target will be described as an example. FIG. 1 is a view illustrating an example of a schematic configuration of a plasma processing system according to an embodiment.

Hereinbelow, a configuration example of a plasma processing system will be described. A plasma processing system includes a capacitively coupled plasma processing apparatus 1 and a controller 2. The capacitively coupled plasma processing apparatus 1 includes a plasma processing chamber 10, a gas supplier 20, a power supply 30, and an exhaust system 40. In addition, the plasma processing apparatus 1 includes a substrate support 11 and a gas introduction part. The gas introduction part is configured to introduce at least one processing gas into the plasma processing chamber 10. The gas introduction part includes a shower head 13. The substrate support 11 is disposed in the plasma processing chamber 10. The shower head 13 is disposed above the substrate support 11. In an embodiment, the shower head 13 constitutes at least a portion of the ceiling of the plasma processing chamber 10. The plasma processing chamber 10 includes a plasma processing space 10s defined by the shower head 13, the side wall 10a of the plasma processing chamber 10, and the substrate support 11. In addition, the plasma processing chamber 10 includes at least one gas supply port configured to supply at least one processing gas to the plasma processing space 10s, and at least one gas discharge port configured to discharge gas from the plasma processing space. The side wall 10a is grounded. The shower head 13 and the substrate support 11 are electrically insulated from the plasma processing chamber 10 housing.

The substrate support 11 includes a main body 111 and a ring assembly 112. The main body 111 includes a central region (a substrate support surface) 111a configured to support a substrate (wafer) W and an annular region (a ring support surface) 111b configured to support the ring assembly 112. The annular region 111b of the main body 111 surrounds the central region 111a of the main body 111 in a plan view. The substrate W is placed on the central region 111a of the main body 111, and the ring assembly 112 is disposed on the annular region 111b of the main body 111 to surround the substrate W on the central region 111a of the main body 111. In an embodiment, the main body 111 includes a base and an electrostatic chuck. The base includes a conductive member. The conductive member of the base functions as a lower electrode. The electrostatic chuck is placed on the base. The top surface of the electrostatic chuck has a substrate support surface 111a. The ring assembly 112 includes one or more annular members. At least one of the one or more annular members is an edge ring. Although not illustrated, the substrate support 11 may include a temperature regulation module configured to regulate at least one of the electrostatic chuck, the ring assembly 112, and a substrate to a target temperature. The temperature regulation module may include a heater, a heat transfer medium, a flow path, or a combination thereof. A heat transfer fluid, such as brine or gas, flows through the flow path. The substrate support 11 may include a heat transfer gas supplier configured to supply a heat transfer gas to the space between the rear surface of the substrate W and the substrate support surface 111a.

The substrate support 11 is configured to be capable of measuring the temperature of the substrate support surface 111a. For example, the substrate support 11 is provided with sensors 113 at plural positions, respectively, which are temperature measurement targets of the substrate support surface 111a. The plasma processing apparatus 1 is provided with a measurement system 130. Each sensor 113 is connected to the measurement system 130 by an optical fiber 114. The measurement system 130 measures the temperature of the substrate support surface 111a by each sensor 113, and outputs the measured temperature data to the controller 2.

The shower head 13 is configured to introduce at least one processing gas from the gas supplier 20 into the plasma processing space 10s. The shower head 13 includes at least one gas supply port 13a, at least one gas diffusion chamber 13b, and gas introduction ports 13c. The processing gas supplied to the gas supply port 13a passes through the gas diffusion chamber 13b and is introduced into the plasma processing space 10s from the gas introduction ports 13c. In addition, the shower head 13 includes a conductive member. The conductive member of the shower head 13 functions as an upper electrode. In addition to the shower head 13, the gas introduction part may include one or more side gas injectors (SGIs) installed in one or more openings formed in the side wall 10a.

The gas supplier 20 may include at least one gas source 21 and at least one flow rate controller 22. In an embodiment, the gas supplier 20 is configured to supply at least one processing gas from a corresponding gas source 21 to the shower head 13 via a corresponding flow rate controller 22. Each flow rate controller 22 may include, for example, a mass flow controller or a pressure-controlled flow rate controller. In addition, the gas supplier 20 may include at least one flow rate modulation device configured to modulate or pulsate the flow rates of one or more processing gases.

The power supply 30 includes an RF power supply 31 coupled to the plasma processing chamber 10 via at least one impedance matching circuit. The RF power supply 31 is configured to supply at least one RF signal (RF power) such as a source RF signal and a bias RF signal to the conductive member of the substrate support 11 and/or the conductive member of the shower head 13. As a result, plasma is formed from the at least one processing gas supplied to the plasma processing space 10s. Therefore, the RF power supply 31 may function as at least a part of a plasma generator configured to generate plasma from one or more processing gases in the plasma processing chamber 10. By supplying the bias RF signal to the conductive member of the substrate support 11, a bias potential is generated in the substrate W, and an ionic component in the formed plasma can be drawn into the substrate W.

In an embodiment, the RF power supply 31 includes a first RF generator 31a and a second RF generator 31b. The first RF generator 31a is coupled to the conductive member of the substrate support 11 and/or the conductive member of the shower head 13 via at least one impedance matching circuit, and is configured to generate a source RF signal (source RF power) for plasma generation. In an embodiment, the source RF signal has a frequency in the range of 13 MHz to 150 MHz. In an embodiment, the first RF generator 31a may be configured to generate multiple source RF signals having different frequencies. The generated one or more source RF signals are supplied to the conductive member of the substrate support 11 and/or the conductive member of the shower head 13. The second RF generator 31b is coupled to the conductive member of the substrate support 11 via at least one impedance matching circuit, and is configured to generate a bias RF signal (bias RF power). In an embodiment, the bias RF signal has a lower frequency than the source RF signal. In an embodiment, the bias RF signal has a frequency in the range of 400 kHz to 13.56 MHz. In an embodiment, the second RF generator 31b may be configured to generate multiple bias RF signals having different frequencies. The generated one or more bias RF signals are supplied to the conductive member of the substrate support 11. In addition, in various embodiments, at least one of the source RF signal and the bias RF signal may be pulsed.

The power supply 30 may include a DC power supply 32 coupled to the plasma processing chamber 10. The DC power supply 32 includes a first DC generator 32a and a second DC generator 32b. In an embodiment, the first DC generator 32a is connected to the conductive member of the substrate support 11 and is configured to generate a first DC signal. The generated first bias DC signal is applied to the conductive member of the substrate support 11. In an embodiment, the first DC signal may be applied to another electrode such as an electrode in an electrostatic chuck. In an embodiment, the second DC generator 32b is connected to the conductive member of the shower head 13 and is configured to generate a second DC signal. The generated second DC signal is applied to the conductive member of the shower head 13. In various embodiments, at least one of the first and second DC signals may be pulsed. The first and second DC generators 32a and 32b may be provided in addition to the RF power supply 31, or the first DC generator 32a may be provided in place of the second RF generator 31b.

The exhaust system 40 may be connected to, for example, a gas discharge port 10e provided in the bottom portion of the plasma processing chamber 10. The exhaust system 40 may include a pressure regulation valve and a vacuum pump. By the pressure regulation valve, the pressure in the plasma processing space 10s is regulated. The vacuum pump may include a turbo molecular pump, a dry pump, or a combination thereof.

The controller 2 processes computer-executable commands that cause the plasma processing apparatus 1 to execute various processes described in the present disclosure. The controller 2 may be configured to control each element of the plasma processing apparatus 1 to perform various processes described herein. In an embodiment, a part or all of the controller 2 may be included in the plasma processing apparatus 1. The controller 2 may include, for example, a computer 2a. The computer 2a may include, for example, a processing unit (a central processing unit (CPU)) 2a1, a storage part 2a2, and a communication interface 2a3. The processing part 2a1 may be configured to perform various control operations based on programs stored in the storage part 2a2. The storage part 2a2 may include a random access memory (RAM), a read only memory (ROM), a hard disk drive (HDD), a solid state drive (SSD), or a combination thereof. The communication interface 2a3 may communicate with the plasma processing apparatus 1 via a communication line such as a local area network (LAN).

Figure 2:
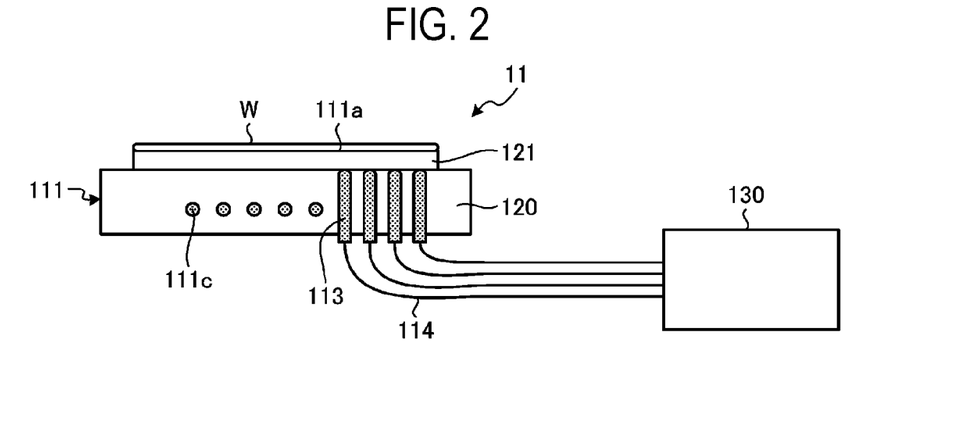
FIG. 2 is a view illustrating an example of a schematic configuration of a substrate support according to an embodiment.

Next, the configuration of the substrate support 11 according to an embodiment will be described. FIG. 2 is a diagram illustrating an example of a schematic configuration of the substrate support 11 according to the embodiment.

The substrate support 11 is configured to be able to support a substrate W. For example, in the main body 111 of the substrate support 11, an electrostatic chuck 121 is disposed on the base 120. The electrostatic chuck 121 is bonded to the base 120 with an adhesive. The top surface of the electrostatic chuck 121 is a substrate support surface 111a for supporting the substrate W.

The base 120 includes a conductive member. For example, the base 120 is made of a conductive metal such as aluminum. The base 120 has a flow path 111c through which a heat transfer fluid flows in the interior thereof, which is below the substrate support surface 111a.

The electrostatic chuck 121 includes, for example, an insulating layer of, for example, ceramic or the like and a film-shaped electrode provided in the insulating layer. The electrostatic chuck 121 generates an electrostatic attractive force when a DC voltage is applied to an electrode provided therein from a power supply (not illustrated), and attracts and holds the substrate W.

The main body 111 is provided with sensors 113 at positions, respectively, which are temperature measurement targets of the substrate support surface 111a. For example, the base 120 is provided with the sensors 113 in holes formed at positions which are temperature measurement targets of the substrate support surface 111a. Each sensor 113 is connected to the measurement system 130 by an optical fiber 114. The upper ends of the sensors 113 may be exposed to the substrate support surface 111a by forming holes in the electrostatic chuck 121 as well, or the upper ends may be provided at a predetermined thickness position from the substrate support 11 without being exposed to the substrate support 11.

Figure 3:
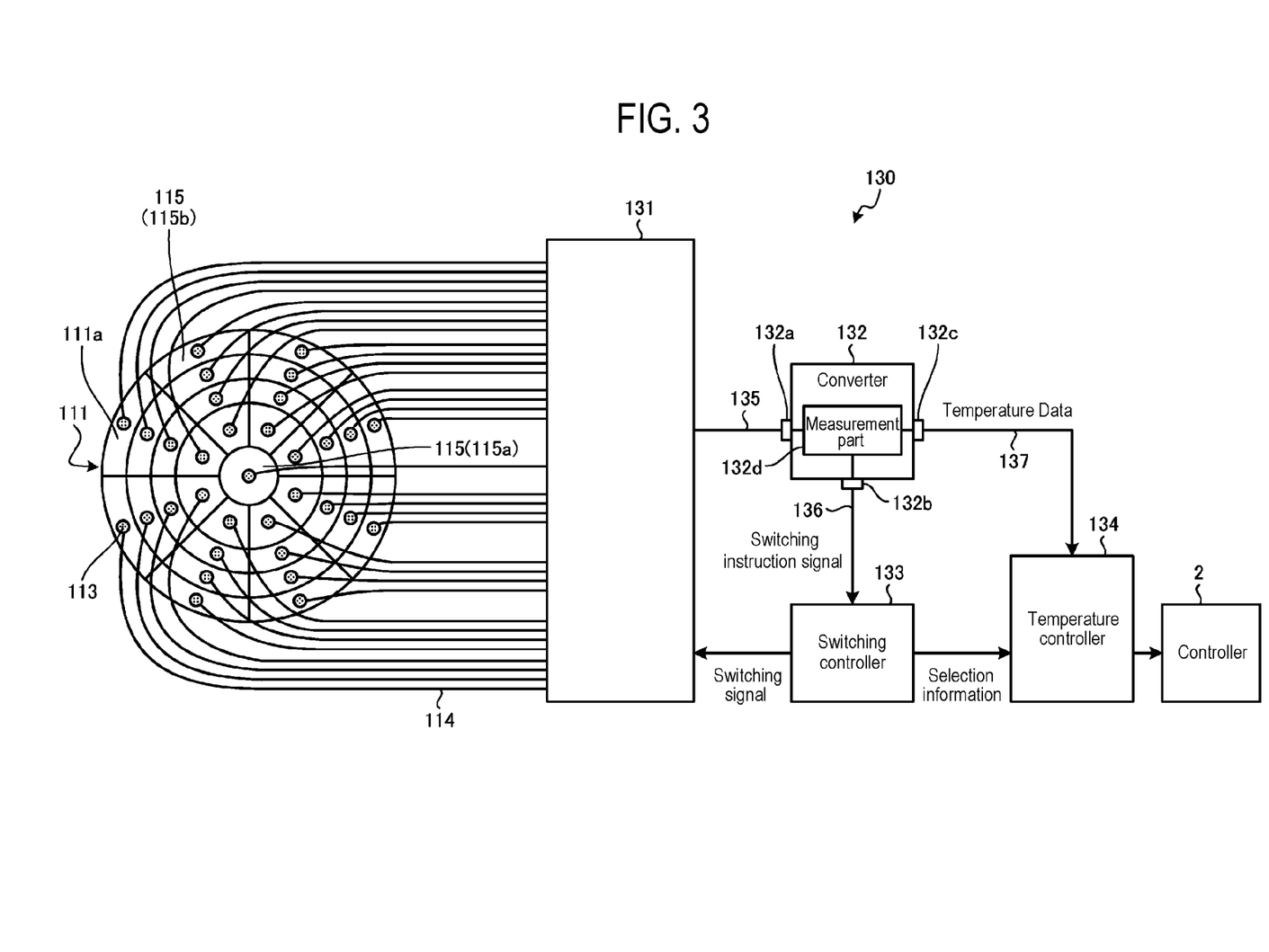
FIG. 3 is a view illustrating an example of a configuration of measuring the temperature of a substrate support surface according to an embodiment.

Next, a configuration for measuring the temperature of the substrate support surface 111a of the substrate support 11 according to an embodiment will be described. FIG. 3 is a view illustrating an example of a configuration of measuring the temperature of the substrate support surface 111a according to the embodiment. FIG. 3 illustrates a plan view of the substrate support surface 111a of the substrate support 11 on which a substrate W is placed.

As illustrated in FIG. 3, the substrate support surface 111a is a substantially circular region in a plan view. The diameter of the substrate support surface 111a is substantially the same as the diameter of the substrate W, or is slightly smaller than the diameter of the substrate W.

The substrate support 11 is configured such that the temperature thereof can be controlled for each zone 115 obtained by dividing the substrate support surface 111a. For example, the substrate support surface 111a is divided into plural zones 115, and a heater is provided in each zone 115. In the embodiment, as illustrated in FIG. 3, the substrate support surface 111a is divided into a central circular zone 115a and plural arc-shaped zones 115b obtained by dividing in the circumferential direction plural ring-shaped regions concentrically surrounding the circular zone 115a. The substrate support surface 111a is provided with heaters in the circular zone 115a and the arc-shaped zones 115b, respectively, so that the temperature can be controlled for each zone 115. The method of dividing the zones 115 illustrated in FIG. 3 is an example and is not limited thereto. The substrate support surface 111a may be divided into more zones 115. For example, the substrate support surface 111a may be divided such that the arc-shaped zones 115b closer to the outer circumference have a smaller angle width and a narrower radial width. The heaters are individually connected to a heater power supply (not illustrated). The heater power supply supplies individually adjusted power to each heater under the control of the controller 2. As a result, the heat generated by each heater is individually controlled, and the temperatures of the zones 115 in the substrate support surface 111a are individually adjusted.

In addition, the temperature of the substrate support 11 can be measured for each zone 115 of the substrate support surface 111a. For example, the substrate support 11 is provided with sensors 113 in the circular zone 115a and the arc-shaped zones 115b, respectively, so that the temperature in each of the zones 115a and 115b can be measured.

Figure 4A:
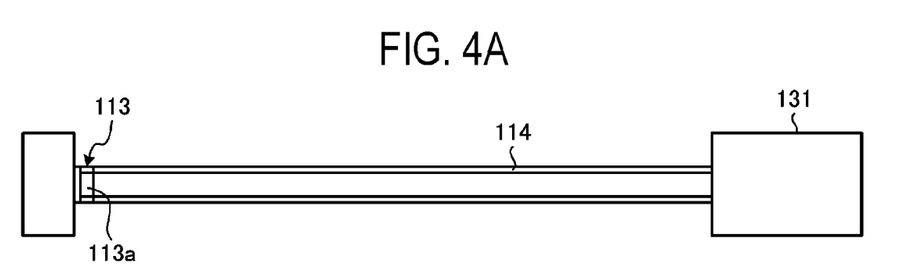
FIG. 4A is a view illustrating an example of a configuration of a sensor according to an embodiment.
Figure 4B:
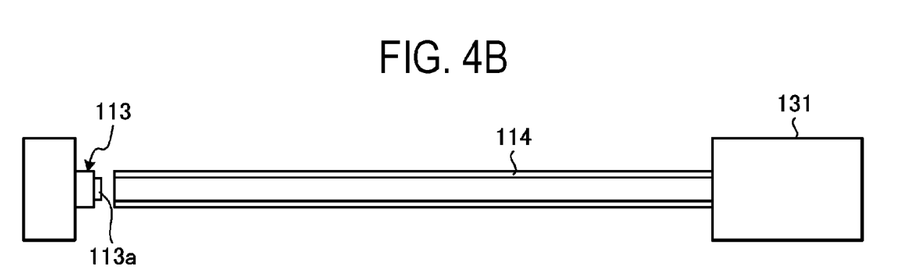
FIG. 4B is a view illustrating another example of a configuration of a sensor according to an embodiment.

FIG. 4A is a view illustrating an example of the configuration of the sensor 113 according to an embodiment. The sensor 113 is provided with a phosphor 113a. An optical fiber 114 is connected to the sensor 113. FIG. 4A illustrates the case where the sensor 113 and the optical fiber 114 are integrally configured. The phosphor 113a is provided at the tip end of the optical fiber 114. The phosphor 113a is fixed to a measurement target, of which the temperature is to be measured. In the present embodiment, the phosphor 113a is fixed at a position that is a temperature measurement target of the bottom surface of the electrostatic chuck 121. In FIG. 4A, the phosphor 113a is integrally provided at the tip end of the optical fiber 114 as the sensor 113. However, the present disclosure is not limited thereto. FIG. 4B is a view illustrating another example of the configuration of the sensor 113 according to the embodiment. FIG. 4B illustrates another case where the sensor 113 and the optical fiber 114 are configured as separate bodies. The sensor 113 is provided with a phosphor 113a. The sensor 113 is fixed at a position that is a temperature measurement target of the bottom surface of the electrostatic chuck 121. An optical fiber 114 is connected to the sensor 113. A slight gap may be provided between the sensor 113 and the optical fiber 114.

The light emitted by the phosphor 113a is incident on the optical fiber 114 and transmitted. In addition, the light transmitted through the optical fiber 114 is incident on the phosphor 113a.

Referring back to FIG. 3, the measurement system 130 includes a multiplexer 131, a converter 132, a switching controller 133, and a temperature controller 134. The converter 132, the switching controller 133, and the temperature controller 134 may be configured as separate devices, or any two or all of them may be configured as one device. For example, the converter 132 may be configured as one device, and the switching controller 133 and the temperature controller 134 may be configured as one controller. In an embodiment, the converter 132 corresponds to the measurement apparatus of the present disclosure.

The multiplexer 131 is a device that can selectively switch light output from input light beams. An optical fiber 114 connected to each sensor 113 is connected to the multiplexer 131. In addition, the multiplexer 131 is connected to the converter 132 by an optical fiber 135. The light of the phosphor 113a of each sensor 113 is transmitted to the multiplexer 131 via each optical fiber 114. The multiplexer 131 selectively outputs the light transmitted from each optical fiber 114 to the optical fiber 135. In addition, the multiplexer 131 is capable of selectively switching the optical fiber 114 that outputs light to the optical fiber 135 according to a switching signal input from the switching controller 133.

Figure 5:
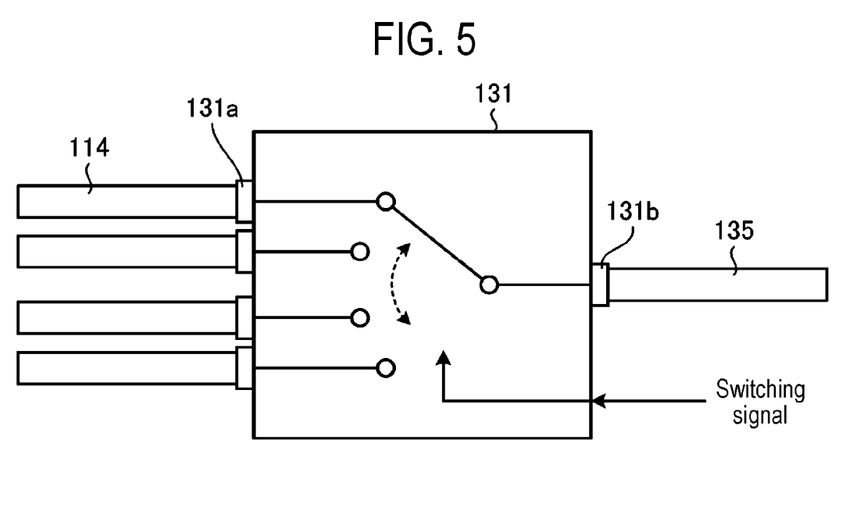
FIG. 5 is a view schematically illustrating an example of a functional configuration of a multiplexer according to an embodiment.

FIG. 5 is a view illustrating an example schematically illustrating the functional configuration of the multiplexer 131 according to an embodiment. The multiplexer 131 is provided with first ports 131a, and each optical fiber 114 is connected to one of the first ports 131a. The first ports 131a are respectively assigned with port numbers as continuous numerical values. The multiplexer 131 is provided with a second port 131b, and the optical fiber 135 is connected to the second port 131b. In the multiplexer 131, a port number to be output is included in the switching signal input from the switching controller 133. The multiplexer 131 is configured to be capable of switching a transmission path for transmitting internal light. The multiplexer 131 switches the transmission path so as to transmit light between the first port 131a of the port number included in the switching instruction and the second port 131b in response to a switching instruction. As a result, the multiplexer 131 is configured such that mutual light transmission is enabled between the optical fiber 114 connected to the first port 131a of the port number and the optical fiber 135 connected to the second port 131b.

Referring back to FIG. 3, the converter 132 measures the temperature from the light transmitted through the optical fiber 135. FIG. 3 schematically illustrates an example of the functional configuration of the converter 132 according to the embodiment. The converter 132 is provided with a port 132a, and the optical fiber 135 is connected to the port 132a. Light transmitted through the optical fiber 135 is input to the port 132a. In addition, the converter 132 is provided with a port 132b and a port 132c. The port 132b is connected to the switching controller 133 via a wire 136. The port 132c is connected to the temperature controller 134 via a wire 137. In an embodiment, the port 132a corresponds to an input part of the present disclosure. In addition, the port 132b corresponds to the output part of the present disclosure. In addition, the port 132c corresponds to the data output part of the present disclosure.

The converter 132 has a measurement part 132d. The measurement part 132d may be configured by combining plural devices such as a microcomputer and a light reception element, or may be physically configured as one device.

A signal corresponding to the state of a measurement target is input to the port 132a. The measurement part 132d measures the state of the measurement target from the signal input to the port 132a. In the present embodiment, the light emitted by the phosphor 113a of the sensor 113 is input to the port 132a via the optical fibers 114 and 135. In the measurement part 132d, the light input to the port 132a is incident on the light reception element. The measurement part 132d measures the temperature from the light incident on the light reception element. For example, the measurement part 132d includes a light source such as an LED. The measurement part 132d is configured to be capable of guiding the light of the light source onto the optical path of the light incident on the light reception element by an optical element such as a beam splitter. When measuring the temperature, the measurement part 132d turns on the light source to irradiate the phosphor 113a with light via the optical fibers 114 and 135. When the phosphor 113a is irradiated with light, electrons are excited from a valence band to a conductor. Excited electrons temporarily retain potential energy, but immediately return to the valence band while releasing the potential energy. However, a part of the energy is emitted as light. This emitted light is called luminescence light. In the phosphor 113a, the period during which the amount of luminescence light is attenuated changes depending on the temperature. The measurement part 132d is configured to measure the temperature by measuring the time until the amount of luminescence light of the phosphor 113a input via the optical fibers 114 and 135 is attenuated to a predetermined level after the light source is turned off. For example, the measurement part 132d measures the temperature by storing data storing the time until the amount of luminescence light is attenuated to a predetermined level for each temperature, and obtaining the temperature corresponding to the measured time with reference to the data. The measurement part 132d outputs the temperature data indicating the measured temperature from the port 132c to the temperature controller 134.

When the temperature measurement is completed, the measurement part 132d generates a switching instruction signal instructing the switching of the multiplexer 131. For example, the measurement part 132d generates a switching instruction signal at the time at which the temperature measurement is completed. The measurement part 132d outputs the generated switching instruction signal from the port 132b to the switching controller 133. The measurement part 132d may generate a switching instruction signal at a time after a predetermined period in which the light emission of the phosphor 113a is attenuated has elapsed after the light source was turned off.

The converter 132 receives a temperature measurement initiating instruction and a temperature measurement terminating instruction. For example, the converter 132 receives the temperature measurement initiating instruction and the temperature measurement terminating instruction from the temperature controller 134. When initiating or terminating the temperature measurement, for example, the temperature controller 134 outputs the temperature measurement initiating instruction and the temperature measurement terminating instruction to the converter 132 and the switching controller 133. When receiving the temperature measurement initiating instruction, the converter 132 repeats, until the temperature measurement terminating instruction is received, measuring the temperature by the measurement part 132d and generating and outputting a switching instruction signal at a time at which the temperature measurement is completed. When the temperature measurement initiating instruction is input, the switching controller 133 initiates a process of outputting a switching signal and selection information in response to the input of the switching instruction signal, and repeats the process until the temperature measurement terminating instruction is received. The converter 132 may receive the temperature measurement initiating instruction and the temperature measurement terminating instruction from the switching controller 133, and may also receive the instructions from other devices. For example, when the temperature controller 134 outputs the temperature measurement initiating instruction and the temperature measurement terminating instruction to the switching controller 133 and the switching controller 133 receives the temperature measurement initiating instruction and the temperature measurement terminating instruction from the temperature controller 134, the switching controller 133 may output the temperature measurement initiating instruction and the temperature measurement terminating instruction to the converter 132.

The switching controller 133 is connected to the multiplexer 131, the converter 132, and the temperature controller 134. The switching controller 133 controls the multiplexer 131. For example, when the switching instruction signal is input from the converter 132, the multiplexer 131 changes port numbers to be output in order, and outputs the switching signal including the changed port numbers to the multiplexer 131. For example, the switching controller 133 is set with a range of port numbers assigned to respective first ports 131a of the multiplexer 131. The switching controller 133 counts up the port number to be output each time the switching instruction signal is input, and when the counted-up port number exceeds the range of port numbers, the switching controller 133 initializes the port number to be output to the minimum value in the range of port numbers. The switching controller 133 outputs a switching signal including the changed port number to the multiplexer 131. In addition, the switching controller 133 outputs the selection information including the changed port number to the temperature controller 134.

When the switching signal is input from the switching controller 133, the multiplexer 131 switches the transmission path so as to transmit light between the first port 131a of the port number included in the switching instruction and the second port 131b. As a result, the sensor 113 of the target, of which the temperature is to be measured by the converter 132, is switched, and the zone 115 of which the temperature is to be measured is switched.

The temperature controller 134 is connected to the converter 132 and the switching controller 133. Temperature data is input from the converter 132 to the temperature controller 134. In addition, the selection information including the port number is input from the switching controller 133 to the temperature controller 134. The port number of the selection information indicates the port number currently selected by the multiplexer 131. The temperature controller 134 associates the currently selected port number with the temperature data input from the converter 132 and outputs them to the controller 2. Since the first ports 131a of the converter 132 are individually connected to the sensors 113 of respective zones 115, the zone 115, of which the temperature is measured, is determined by the port number. Therefore, from the port number, it is possible to identify which zone 115 the temperature data corresponds to. In addition, the temperature controller 134 may store the corresponding information between the port number and the zone 115. Then, the temperature controller 134 may identify the corresponding zone 115 from the port number of the selection information by referring to the corresponding information, and may output the information of the identified zone 115 to the controller 2 in association with the input temperature data.

The temperature data of each zone 115 is repeatedly input to the controller 2 in order. The controller 2 controls the temperature of each zone 115 based on the input temperature data. For example, the controller 2 controls the temperature of the heater in each zone 115 such that the temperature in each zone 115 becomes the temperature of the processing condition based on the input temperature data.

Here, in the plasma processing apparatus 1, in order to finely control the temperature distribution of the substrate support surface 111a of the substrate support 11, the zone 115 of the substrate support surface 111a is being subdivided. For example, in the example of FIG. 3, the substrate support surface 111a is divided into 33 zones 115, and it is required to measure the temperature accurately in each zone 115.

When measuring the temperatures of the plurality of zones 115, it may be possible to consider, for example, a configuration in which converters 132 that measure the temperatures are provided as many as the number of zones 115 and optical fibers 114 are individually connected to the converters to measure the temperatures. However, with such a configuration, the number of converters 132 is increased and the cost is increased. Therefore, in the plasma processing apparatus 1 according to the present embodiment, each optical fiber 114 is connected to the multiplexer 131, and the light beams of the optical fibers 114 are sequentially output to the converter 132 by the multiplexer 131 to measure the temperatures.

In the related arts, when the light beams of the optical fibers 114 are sequentially switched by the multiplexer 131 and output to the converter 132, the switching operation pattern is written in the internal memory of the switching controller 133. The switching controller 133 outputs a switching instruction to the multiplexer 131 according to the switching operation pattern stored in the internal memory. In this case, it is necessary for the switching controller 133 to output the switching instruction to the multiplexer 131 with a margin for the period during which the temperatures are measured by the converter 132. Therefore, in the switching operation pattern, the switching timing is determined with a margin for the period during which the temperatures are measured by the converter 132. Therefore, in the related arts, the measurement time becomes long. As described above, in the plasma processing apparatus 1, the zones 115 of the substrate support surface 111a are being subdivided and the larger the number of zones 115, the longer the margin. Thus, the measurement time becomes longer.

Therefore, when the temperature measurement is completed, the converter 132 according to the present embodiment generates a switching instruction signal instructing the switching of the multiplexer 131, and outputs the generated switching instruction signal to the switching controller 133. This makes it possible for the converter 132 to quickly output a switching instruction signal when the temperature measurement is completed. When the switching instruction signal is input from the converter 132, the switching controller 133 outputs a switching signal to the multiplexer 131. This makes it possible to quickly switch the multiplexer 131. As a result, it is possible to shorten the measurement time.

In the embodiment, the case where the measurement part 132d generates a switching instruction signal every time the temperature is measured once and outputs the switching instruction signal from the port 132b to the switching controller 133 has been described as an example. However, the present disclosure is not limited thereto. The measurement part 132d may generate a switching instruction signal every time the temperature measurement is completed a predetermined number of times, and output the switching instruction signal from the port 132b to the switching controller 133. In this case, the temperature of the same zone 115 is measured a predetermined number of times, and the temperature data is output to the temperature controller 134 a predetermined number of times. With the temperature controller 134, it is possible to improve the accuracy of the temperature, for example, by obtaining an average temperature from the temperature data of a predetermined number of times. Here, when the measurement part 132d performs temperature measurement a predetermined number of times in this way, in the related arts, it is necessary for the switching controller 133 to output the switching instruction to the multiplexer 131 with a margin for the predetermined number of times. Thus, the measurement time becomes longer. However, in the present embodiment, when the temperature measurement is completed a predetermined number of times, the measurement part 132d promptly generates and outputs a switching instruction signal so that the measurement time can be shortened.

In the embodiment, the case where the measurement part 132d outputs temperature data indicating a measured temperature from the port 132c to the temperature controller 134 every time the temperature is measured once has been described as an example. However, the present disclosure is not limited thereto. The measurement part 132d may measure temperatures a predetermined number of times, obtain an average temperature for the temperatures measured the predetermined number of times, and output temperature data indicating the obtained average temperature from the port 132c to the temperature controller 134. In this way, since the measurement part 132d obtains the average temperature for the temperatures measured a predetermined number of times, it is possible to improve temperature accuracy.

In the embodiment, the case where the temperature is measured as the state of a measurement target has been described as an example. However, the present disclosure is not limited thereto. The measurement target is not limited to the temperature and may be any of others.

In the embodiment, the case where the measurement part 132d outputs a switching instruction signal to the switching controller 133 has been described as an example. However, the present disclosure is not limited thereto. When the multiplexer 131 has the function of the switching controller 133, the measurement part 132d may output the switching instruction signal to the multiplexer 131. In addition, when the temperature controller 134 has the function of the switching controller 133, the measurement part 132d may output the switching instruction signal to the temperature controller 134.

In the embodiment, the case where the multiplexer 131 selectively outputs the light emitted by the phosphor 113a provided on the measurement target to the converter 132, and the temperature as the state of the measurement target is measured from the light input by the converter 132 has been described as an example. However, the present disclosure is not limited thereto. For example, the multiplexer 131 may selectively output an electric signal indicating the state of the measurement target to the converter 132, and the state of the measurement target may be measured from the electric signal input by the converter 132.

In the embodiment, a plasma processing system having a system configuration including the plasma processing apparatus 1 and the controller 2 has been described as an example. However, the present disclosure is not limited thereto. As described above, a part or all of the controller 2 may be included in the plasma processing apparatus 1. That is, the configuration including the plasma processing apparatus 1 and the controller 2 of the embodiment may be regarded as the plasma processing apparatus 1.

Figure 6:
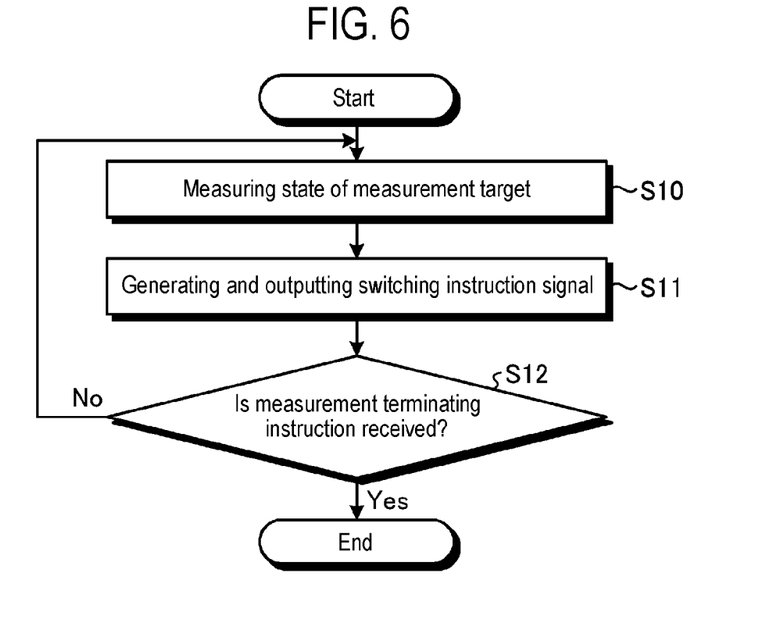
FIG. 6 is a view illustrating an example of a processing order of a measurement method according to an embodiment.

Next, the processing flow of the measurement method carried out by the converter 132 according to the embodiment will be described. FIG. 6 is a view illustrating an example of a processing order of a measurement method according to an embodiment. The process of the measurement method illustrated in FIG. 6 is executed when the converter 132 receives a temperature measurement initiating instruction.

The measurement part 132d measures the state of a measurement target from a signal input to the port 132a (step S10). For example, the measurement part 132d is configured to measure a temperature by turning on the light source to irradiate the phosphor 113a with light and measuring the time until the amount of luminescence light of the input phosphor 113a is attenuated to a predetermined level after the light source is turned off.

When the measurement is completed, the measurement part 132d generates a switching instruction signal and outputs the generated switching instruction signal from the port 132b to the switching controller 133 (step S11).

The measurement part 132d determines whether or not a temperature measurement terminating instruction is received (step S12). When the temperature measurement terminating instruction is not received (step S12: "No"), the process proceeds to step S10 described above. When the temperature measurement terminating instruction is received (step S12: "Yes"), the process is terminated.

As described above, the converter 132 (the measurement apparatus) according to an embodiment includes a port 132a (the input part), a measurement part 132d, and a port 132b (the output part). A signal corresponding to the state of the measurement target is input to the port 132a. The measurement part 132d measures the state of the measurement target from the signal input to the port 132a. When the measurement is completed, the measurement part 132d generates a switching instruction signal instructing switching of the multiplexer 131 that selectively outputs a signal. The port 132b outputs the switching instruction signal generated by the measurement part 132d. This makes it possible for the converter 132 to shorten the measurement time.

Since the port 132a is configured such that the optical fiber 135 is connectable to the port 132a, the light emitted by the phosphor 113a provided in the measurement target is input via the optical fibers 114 and 135. The measurement part 132d includes a light source and is configured to measure the temperature of the measurement target by turning on the light source to irradiate the phosphor 113a with light via the optical fibers 114 and 135 by and measuring the time until the amount of light of the phosphor 113a input via the optical fibers 114 and 135 is attenuated to a predetermined level after the light source is turned off. When the temperature measurement is completed, the measurement part 132d generates a switching instruction signal to instruct switching of the multiplexer 131 that selectively outputs one ray of light from the light of the plural phosphors 113a, each of which is provided for one of the plural measurement targets, to the optical fiber. This make it possible for the converter 132 to shorten the measurement time for measuring the temperature from the light of the phosphor 113a.

In addition, the measurement part 132d generates a switching instruction signal at the time at which the temperature measurement is completed. This makes it possible for the converter 132 to output a switching instruction signal at the time at which the temperature measurement is completed, so that the measurement time can be shortened.

In addition, the measurement part 132d generates a switching instruction signal at a time after a predetermined period in which the light emission of the phosphor 113a is attenuated has elapsed after the light source was turned off. This makes it possible for the converter 132 to output a switching instruction signal after a predetermined period of time in which the emission of the phosphor 113a is attenuated has elapsed after the light source was turned off, so that the margin can be reduced compared with the related arts. Thus, the measurement time can be shortened.

The measurement part 132d generates a switching instruction signal every time the temperature measurement is completed a predetermined number of times. As a result, since the converter 132 promptly generates and outputs a switching instruction signal when the temperature measurement is completed a predetermined number of times, the measurement time can be shortened.

In addition, the measurement part 132d measures the temperature of the measurement target a predetermined number of times and obtains an average temperature for the temperatures measured the predetermined number of times. This makes it possible for the converter 132 to improve temperature accuracy.

In addition, the converter 132 further includes a port 132c (the data output part). The port 132c outputs data indicating the state of the measurement target measured by the measurement part 132d. This makes it possible for the converter 132 to output data indicating the measured state of the measurement target.

In addition, the measurement system 130 according to the embodiment includes a multiplexer 131 and a converter 132 (the measurement apparatus). The multiplexer 131 selectively outputs one signal from plural signals indicating the state of the measurement target, and switches the output signal in response to the input of the switching instruction signal instructing the switching. The converter 132 includes a port 132a (the input part), a measurement part 132d, and a port 132b (the output part). The signal output from the multiplexer 131 is input to the port 132a. The measurement part 132d measures the state of the measurement target from the signal input to the port 132a. When the measurement is completed, the measurement part 132d generates a switching instruction signal. The port 132b outputs the switching instruction signal generated by the measurement part 132d. This makes it possible for the measurement system 130 to shorten the measurement time.

In addition, the plasma processing apparatus 1 (the substrate processing apparatus) according to the embodiment includes plural phosphors 113a, a multiplexer 131, plural optical fibers 114 (the first optical fibers), and a converter 132 (the measurement apparatus). The plural phosphors 113a are provided at plural positions, respectively, which are temperature measurement targets of the plasma processing apparatus 1. The plural optical fibers 114 transmit rays of light, respectively, which are emitted by the plural phosphors 113a. The multiplexer 131 is connected to the plural optical fibers 114, selectively outputs one ray of light from plural rays of light, which are transmitted through the plural optical fibers 114, to the optical fiber 135 (the second optical fiber), and switches the light output to the optical fiber 135 according to the input of the switching instruction signal instructing switching. The converter 132 includes a port 132a (the input part), a measurement part 132d, and a port 132b (the output part). An optical fiber 135 is connected to the port 132a, so that light output from the multiplexer 131 is input to the port 132a. The measurement part 132d includes a light source and is configured to: measure the temperature of the measurement target by turning on the light source to irradiate the phosphor 113a with light via the optical fibers 114 and 135 and measuring the time until the amount of light of the phosphor 113a input via the optical fibers 114 and 135 is attenuated to a predetermined level after the light source is turned off. When the temperature measurement is completed, the measurement part 132d generates a switching instruction signal. The port 132b outputs the switching instruction signal generated by the measurement part 132d. This makes it possible for the plasma processing apparatus 1 to shorten the temperature measurement time at plural measurement target positions.

In addition, the plural phosphors 113a are provided on the substrate support 11 which supports a substrate W. This makes it possible for the plasma processing apparatus 1 to measure the temperatures at plural positions of the substrate support 11.

Although embodiments have been described above, it should be considered that the embodiments disclosed herein are illustrative and are not restrictive in all respects. Indeed, the embodiments described above can be implemented in various forms. In addition, the above-described embodiments may be omitted, replaced, or modified in various forms without departing from the scope and spirit of the claims.

For example, in the embodiments described above, the case where plasma processing is performed on a semiconductor wafer as a substrate W has been described as an example, but the present disclosure is not limited thereto. The substrate W may be any of others.

In addition, the measurement system 130 according to the present disclosure is applicable not only to a capacitively coupled plasma (CCP) apparatus, but also to other substrate processing apparatuses. Other substrate processing apparatuses include an inductively coupled plasma (ICP) processing apparatus, a plasma processing apparatus using a radial line slot antenna, a helicon wave plasma (HWP) apparatus, an electronic cyclotron resonance (ECR) plasma apparatus, and the like. In addition, the measurement system 130 according to the present disclosure may be used for various substrate processing apparatuses such as a film forming apparatus and a heat treatment device, in addition to the plasma processing apparatus.

It shall be understood that the embodiments disclosed herein are examples in all respects and are not restrictive. Indeed, the above-described embodiments can be implemented in various forms. The embodiments described above may be omitted, replaced, or modified in various forms without departing from the scope and spirit of the appended claims.

According to the present disclosure, a measurement time can be shortened.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A measurement apparatus comprising:

An input part into which light emitted by each of phosphors according to a temperature of each of a plurality of measurement targets is input, wherein the phosphors are provided at positions of the plurality of measurement targets, respectively;

A measurement part configured to measure a temperature of one of the plurality of measurement targets from light input to the input part, and generate, at a time at which the measurement of the temperature of one of the plurality of measurement targets is completed, a switching instruction signal instructing switching a multiplexer, which is configured to selectively output one ray of light from rays of light emitted by the phosphors, from the light of the phosphor provided in one of the plurality of measurement targets to the light of the phosphor provided in another one of the plurality of measurement targets; and An output part configured to output the switching instruction signal generated by the measurement part, wherein the measurement of the temperature of one of the plurality of measurement targets comprises turning on a light source to irradiate a phosphor provided in one of the plurality of measurement targets with light and measuring a time until an amount of light of the phosphor provided in one of the plurality of measurement targets is attenuated to a predetermined level after the light source is turned off, and generate, at a time at which the temperature measurement of one of the plurality of measurement targets is completed, the switching instruction signal instructing the switching of the multiplexer.

2. The measurement apparatus of claim 1, wherein the input part is further configured to be connected with an optical fiber so that light emitted from each of the phosphors is input to the input part via the optical fiber, Wherein the measurement part includes the light source, and Wherein the measurement part is further configured to measure the temperature of one of the plurality of measurement targets by turning on the light source to irradiate the phosphor provided in one of the plurality of measurement targets with light via the optical fiber and measuring the time until the amount of light of the phosphor provided in one of the plurality of measurement targets via the optical fiber is attenuated to the predetermined level after the light source is turned off; and generate, at the time at which the temperature measurement of one of the plurality of measurement targets is completed, the switching instruction signal instructing the switching of the multiplexer, which is further configured to selectively output one ray of light to the optical fiber, from the light of the phosphor provided in one of the plurality of measurement targets to the light of the phosphor provided in another one of the plurality of measurement targets.

3. The measurement apparatus of claim 2, wherein the measurement part is further configured to generate the switching instruction signal every time the temperature measurement is completed a predetermined number of times.

4. The measurement apparatus of claim 3, wherein the measurement part is further configured to measure the temperatures of the plurality of measurement targets the predetermined number of times, and obtain an average temperature for the temperatures measured the predetermined number of times.

5. The measurement apparatus of claim 4, further comprising:

a data output part configured to output data indicating the temperature of each of the plurality of measurement targets measured by the measurement part.

6. The measurement apparatus of claim 1, wherein the input part is further configured to be connected with an optical fiber so that light emitted from each of the phosphors is input to the input part via the optical fiber, wherein the measurement part includes a light source, and wherein the measurement part is further configured to:
measure the temperature of one of the plurality of measurement targets by turning on the light source to irradiate the phosphor provided in one of the plurality of measurement targets with light via the optical fiber and measuring a time until an amount of light of the phosphor provided in one of the plurality of measurement targets input via the optical fiber is attenuated to a predetermined level after the light source is turned off; and generate the switching instruction signal at a time at which a predetermined period during which light emission of the phosphor is attenuated elapses after the light source is turned off, the switching instruction signal instructing the switching of the multiplexer, which is further configured to selectively output one ray of light to the optical fiber, from the light of the phosphor provided in one of the plurality of measurement targets to the light of the phosphor provided in another one of the plurality of measurement targets.

7. The measurement apparatus of claim 6, wherein the measurement part is further configured to generate the switching instruction signal every time the temperature measurement is completed a predetermined number of times.

8. The measurement apparatus of claim 1, further comprising:

a data output part configured to output data indicating the temperature of each of the plurality of measurement targets measured by the measurement part.

9. A measurement system comprising:

A multiplexer configured to selectively output one ray of light from rays of light emitted by phosphors and switch the output light in response to an input of a switching instruction signal, wherein the phosphors are provided at positions of a plurality of measurement targets, respectively, each ray of light is emitted according to a temperature of each of the plurality of measurement targets, and the switching instruction signal instructs switching from the light of the phosphor provided in one of the plurality of measurement targets to the light of the phosphor provided in another one of the plurality of measurement targets; and A measurement apparatus including:

An input part into which the light output from the multiplexer is input;

A measurement part configured to measure the temperature of one of the plurality of measurement targets from the light input to the input part and generate, at a time at which the measurement of the temperature of one of the plurality of measurement targets is completed, the switching instruction signal; and An output part configured to output the switching instruction signal generated by the measurement part, wherein the measurement of the temperature of one of the plurality of measurement targets comprises turning on a light source to irradiate a phosphor provided in one of the plurality of measurement targets with light and measuring a time until an amount of light of the phosphor provided in one of the plurality of measurement targets is attenuated to a predetermined level after the light source is turned off, and generate, at a time at which the temperature measurement of one of the plurality of measurement targets is completed, the switching instruction signal instructing the switching of the multiplexer.

10. A substrate processing apparatus comprising:

phosphors provided at positions, respectively, which are a plurality of measurement targets of a temperature of the substrate processing apparatus;

first optical fibers each configured to transmit light emitted by the phosphors;

a multiplexer connected to the first optical fibers and configured to selectively output one ray of light to a second optical fiber from rays of light transmitted via the first optical fibers, and configured to switch the light output to the second optical fiber according to an input of a switching instruction signal indicating switching from the light of the phosphor provided in one of the plurality of measurement targets to the light of the phosphor provided in another one of the plurality of measurement targets; and a measurement apparatus including:

an input part connected to the second optical fiber and into which the light output from the multiplexer is input;

a measurement part including a light source, configured to measure a temperature of one of the plurality of measurement targets by turning on the light source to irradiate the phosphor provided in one of the plurality of measurement targets with light via the first optical fiber and the second optical fiber and measuring a time until an amount of the light of the phosphor provided in one of the plurality of measurement targets input via the first optical fiber and the second optical fiber is attenuated to a predetermined level after the light source is turned off, and configured to generate, at a time at which the temperature measurement of one of the plurality of measurement targets is completed, the switching instruction signal; and an output part configured to output the switching instruction signal generated by the measurement part.

11. The substrate processing apparatus of claim 10, wherein the phosphors are provided on a substrate support configured to support a substrate.

12. A measurement method comprising:

measuring a temperature of one of a plurality of measurement targets from light emitted by each of phosphors, wherein the phosphors are provided at positions of the plurality of measurement targets, respectively, and each ray of light is emitted according to a temperature of each of the plurality of measurement targets and input to an input part; generating, at a time at which the measuring the temperature of one of the plurality of measurement targets is completed, a switching instruction signal instructing switching of a multiplexer, which is configured to selectively output one ray of light from rays of light emitted by the phosphors, from the light of the phosphor provided in one of the plurality of measurement targets to the light of the phosphor provided in another one of the plurality of measurement targets; and outputting the generated switching instruction signal.

13. The substrate processing apparatus of claim 10, wherein the measurement part is further configured to generate the switching instruction signal every time the temperature measurement is completed a predetermined number of times.

14. The substrate processing apparatus of claim 13, wherein the measurement part is further configured to measure the temperatures of the plurality of measurement targets the predetermined number of times, and obtain an average temperature for the temperatures measured the predetermined number of times.

15. The substrate processing apparatus of claim 14, further comprising:

a data output part configured to output data indicating the temperature of each of the plurality of measurement targets measured by the measurement part.

* * * * *